United States Patent [19]

Foley

[11] 4,099,739

[45] Jul. 11, 1978

[54] HITCHING APPARATUS

[75] Inventor: Newman Clarence Foley, Superior, Wis.

[73] Assignee: N.B.F. Company, Inc., Superior, Wis.

[21] Appl. No.: 759,776

[22] Filed: Jan. 17, 1977

[51] Int. Cl.² ............................................... B60D 1/14
[52] U.S. Cl. .................................... 280/504; 280/475; 280/515
[58] Field of Search ............... 280/508, 515, 504, 475, 280/493

[56] References Cited

U.S. PATENT DOCUMENTS

| 1,972,423 | 9/1934 | Larson | 280/515 |
| 2,196,115 | 4/1940 | Jacobson | 280/515 X |
| 3,370,817 | 2/1968 | Weber | 280/475 |

*Primary Examiner*—Joseph F. Peters, Jr.
*Assistant Examiner*—R. Schrecengost
*Attorney, Agent, or Firm*—Jacobi, Lilling & Siegel

[57] ABSTRACT

Apparatus for hitching mobile equipment, such as a towing vehicle and a towed vehicle, comprising a U-shaped locking member slidably mounted for lateral movement on the rearwardly extending draw bar of the towing vehicle. The draw bar is provided with a rearwardly opening slot that is adapted to receive therein a pin on the forward portion of the tongue connected to the vehicle to be towed. The rear leg of the U-shaped locking member is movable across the rearwardly opening slot in the draw bar to lock the tongue pin therein. The U-shaped locking member is biased to the closed or locking position by a spring, and a manually operable locking pin is movably mounted on the draw bar to releasably lock the U-shaped locking member in an open or a closed position. The tongue of the towed vehicle is provided with an elevator device comprising a tubular leg member pivotally mounted on the lower portion of the tongue, a threaded shaft slidably mounted within the tubular leg member, and a locking bracket for releasably locking the threaded shaft in a predetermined position relative to the tubular member for the purpose of adjusting the height of the tongue. The elevator device is pivotally movable to a down position for the purpose of maintaining the tongue in an elevated position for hitching purposes. After hitching is completed, a spring is provided to move the elevator device to an up position when the vehicles are moved forwardly.

7 Claims, 6 Drawing Figures

HITCHING APPARATUS

BACKGROUND OF THE INVENTION

The present invention relates to hitching apparatus and, more particularly, to apparatus for hitching mobile equipment together which is so constructed that it is possible to accomplish the hitching operation without the operator having to leave the towing vehicle.

Heretofore, many types of hitching apparatus have been used for hitching a towing vehicle, such as a truck or tractor, to a vehicle to be towed, such as a farm implement, trailer or the like. While these previously known forms of hitching apparatus have generally served the purpose, they have been subject to one or more of the following disadvantages:

1. They have been complicated in construction and thus difficult and expensive to manufacture and maintain.
2. They have required the operator to leave the towing vehicle for hitching and unhitching operations;
3. They have required time consuming operations for the proper adjustment of the height of the tongue of the towed vehicle during hitching and unhitching operations;
4. It has been difficult to replace or repair worn parts thereof; and/or
5. It has been difficult to accomplish hitching and unhitching operations owing to the nature of the construction and operation of the hitching apparatus.

It will be seen that a need has arisen for a simple and reliable hitching apparatus which does not require the operator to leave the towing vehicle each time a hitching and unhitching operation is necessary. The present invention satisfies this need.

SUMMARY OF THE INVENTION

The novel and improved hitching apparatus of the present invention comprises apparatus for hitching mobile equipment, such as a towing vehicle and a towed vehicle, comprising a U-shaped locking member slidably mounted for lateral movement on the rearwardly extending draw bar of the towing vehicle. As an illustrative example, the towing vehicle may be a tractor and the towed vehicle may be a farm implement or the like.

The draw bar of the towing vehicle is provided with a rearwardly opening slot that is adapted to receive therein a pin on the forward portion of the tongue connected to the vehicle to be towed. The rear leg of the U-shaped locking member is movable across the rearwardly opening slot in the draw bar to lock the tongue pin therein. A recess is provided in the forward portion of the rear leg and is positioned to receive the pin therein when the locking member is in a closed position and the hitched vehicles are moving forwardly. The U-shaped locking member is biased to the closed or locking position by a spring, and a manually operable locking pin is movably mounted on the draw bar to releasably lock the U-shaped locking member in an open or a closed position. A lanyard may be connected to the pin for remote operation from the towing vehicle.

The front leg of the U-shaped locking member is provided with a notch or slot in the upper surface thereof which is adapted to receive the locking pin therein to retain the locking member in the closed position. The rear leg of the U-shaped locking member is provided with a similar notch or slot in the lower surface thereof so that, in case of wear, the positions of the front and rear legs of the locking member can be reversed without affecting the operability of the hitching apparatus.

The tongue of the towed vehicle is provided with an elevator device comprising a tubular leg member pivotally mounted on the lower portion of the tongue, a threaded shaft slidably mounted within the tubular leg member, and a locking bracket for releasably locking the threaded shaft in a predetermined position relative to the tubular member for the purpose of adjusting the height of the tongue.

The elevator device is pivotally movable to a down position for the purpose of maintaining the tongue in an elevated position for hitching purposes. The lower end of the threaded shaft is provided with ground engaging means for releasably retaining the elevator device in the down position. After hitching is completed, a spring is provided to move the elevator device to an up position as the vehicles are moved forwardly.

DESCRIPTION OF THE PREFERRED EMBODIMENTS

Figure 1:
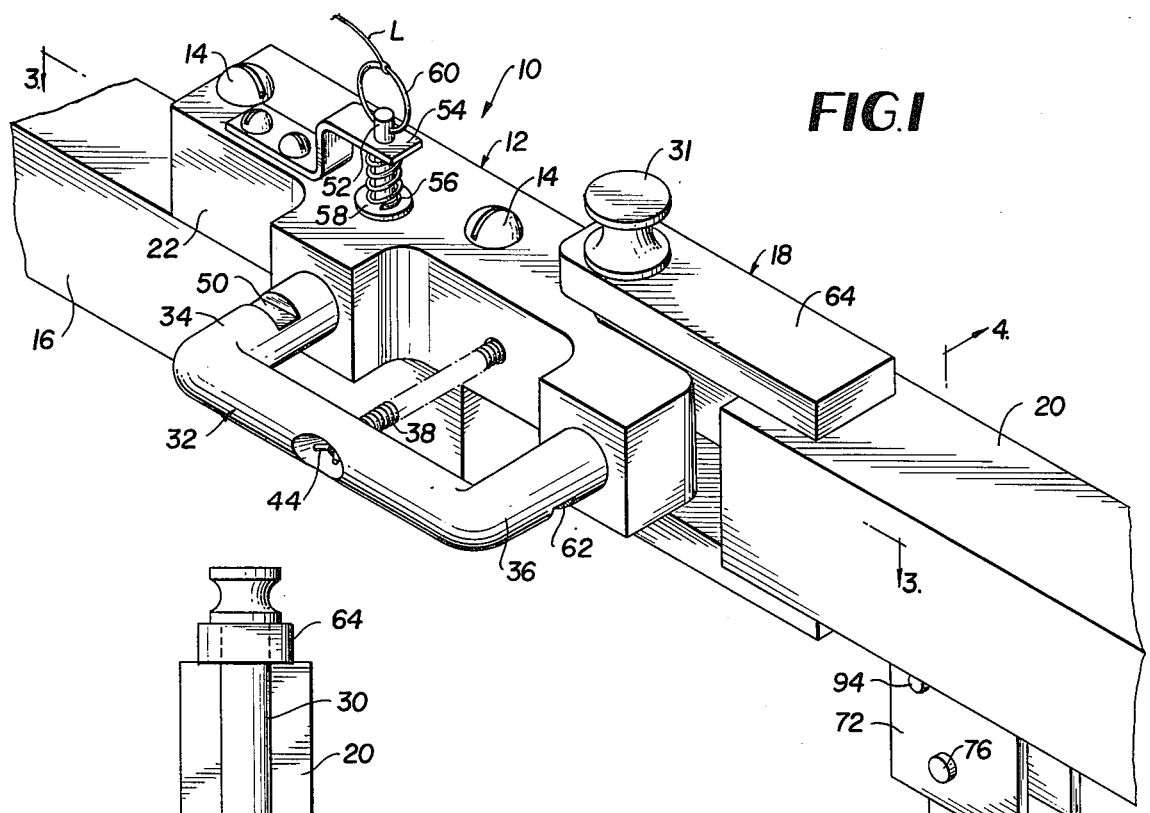
FIG. 1 is a perspective view, with parts broken away, of a hitching apparatus constructed in accordance with the principles of the present invention.

As illustrated in FIG. 1, the hitching apparatus 10 of the present invention generally comprises a locking assembly 12 secured in any suitable manner, such as by bolts 14, to the draw bar 16 of a towing vehicle (not shown), such as a tractor or the like. A pin assembly 18 is secured in any suitable manner to the forward portion of a tongue 20 that is connected to the forward portion of a vehicle (not shown) to be towed, such as a farm implement, trailer or the like. The pin assembly 18 is adapted to cooperate with the locking assembly 12 in a manner to be described hereinafter for the purpose of hitching or connecting the draw bar 16 and tongue 20 together to enable the towing vehicle to pull the vehicle to be towed. The locking assembly 12, draw bar 16, pin assembly 18 and tongue 20 may be formed of any suitable materials, for example, metal such as steel or cast iron.

Figure 3:
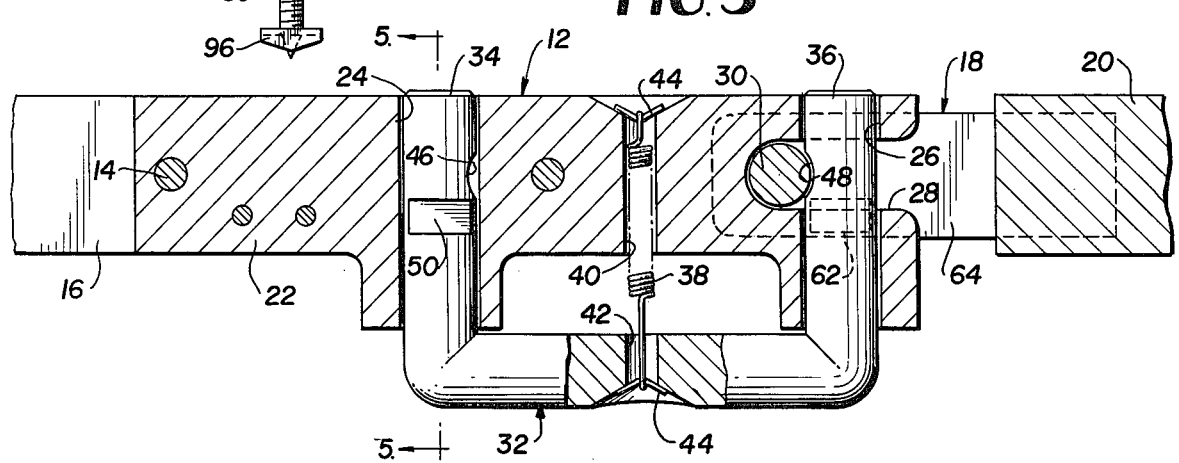
FIG. 3 is an enlarged sectional view, with parts broken away, taken substantially along line 3—3 of FIG. 1.
Figure 5:
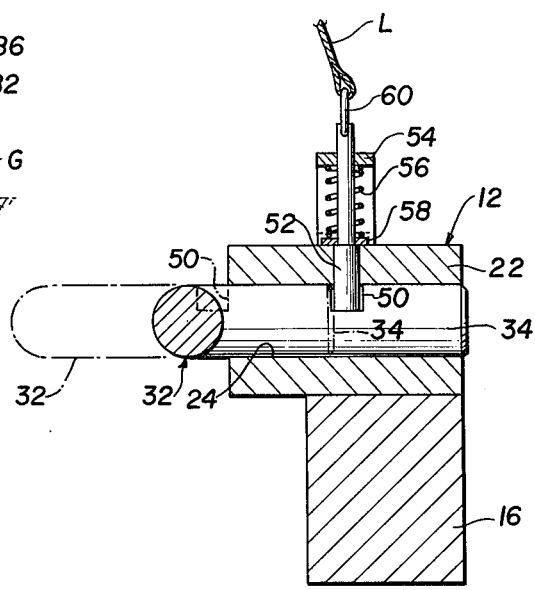
FIG. 5 is an enlarged sectional view taken substantially along line 5-5 in FIG. 3.

Referring to FIGS. 1, 3 and 5, the locking assembly 12 comprises a base 22 having a pair of substantially parallel bores 24 and 26 extending laterally therethrough. The rear end portion of the base 22 is provided with a rearwardly opening, longitudinal slot 28 which intersects the bore 26. The slot 28 is of sufficient width to receive therein the pin 30 of the pin assembly 18 in a manner to be described more fully hereinafter.

A U-shaped locking member 32 comprises a front leg 34 slidably mounted within the bore 24 of the base 22 and a rear leg 36 slidably mounted in the bore 26 of the base. The U-shaped locking member 32 is slidable laterally between the open position shown in FIG. 1, wherein its rear leg 36 is removed from the rearwardly opening slot 28, and the closed or locking position shown in FIG. 3 wherein the rear leg 36 extends across and closes the rearwardly opening slot 28. A helical spring 38, extending through laterally aligned bores 40 and 42 in the base 22 and locking member 32, respectively, serves to bias or urge the locking member 32 to the closed or locking position shown in FIG. 3. The helical spring 38 is connected at its ends to clip members 44 or the like disposed in recesses adjacent the outer ends of the bores 40 and 42.

The rear portion of the front leg 34 and the front portion of the rear leg 36 of the U-shaped locking member 32 are provided with curved recesses 46 and 48, respectively, which are complementary with the outer curved surface of the pin 30 for a purpose to be described more fully hereinafter.

The upper surface of the front leg 34 of the U-shaped locking member 32 is provided with a notch 50 which is of sufficient width so as to be adapted to receive therein the lower end of a locking pin 52 that is slidably mounted on the base 22 for substantially vertical movement into and out of the front lateral bore 24. The upper end of the locking pin 52 is slidable through an aperture in a mounting bracket 54 secured in any suitable manner to the base 22. A helical spring 56 surrounding the upper portion of the pin 52 and extending between the bracket 54 and a flange 58 on the pin 52, serves to urge the pin 52 to the lower locking position shown in FIG. 5 wherein it extends into the bore 24 in the base 22. Preferably, a ring 60 is secured to the upper end of the locking pin 52 and a lanyard L is secured to the ring 60 and extends to the cab portion of the towing vehicle (not shown) to enable remote operation of the locking pin 52.

The lower surface of the rear leg 36 of the locking member 32 is provided with a notch 62 that is substantially the same size as and disposed in substantially longitudinal alignment with the notch 50 in the upper surface of the front leg 34. Because of the curved recesses 46 and 48 and the notches 50 and 62 of the front and rear legs 34 and 36, respectively, of the U-shaped locking member 32, the positions of the front and rear legs 34 and 36 may be reversed in the bores 24 and 26 of the base 22. In this manner, if a portion of one of the legs becomes worn, the positions of the legs 34 and 36 can be reversed without affecting the operability of the U-shaped locking member 32 and its cooperation with the locking pin 52. The positions of the legs 34 and 36 can be changed by merely moving the locking member 32 laterally outwardly against the force of the spring 38 until the legs 34 and 36 have been moved out of the bores 24 and 26, then reversing the positions of the legs and inserting the reversed legs in the bores 24 and 26.

As specifically shown in FIG. 5, the locking pin 52 serves to releasably lock the U-shaped locking member 32 in the closed position shown in FIG. 3 or in the open position shown in FIG. 1. When the U-shaped locking member 32 is in the closed position shown in FIG. 3 and in solid lines in FIG. 5, the locking pin 52 extends into the notch 50 in the front leg 34 (or into the notch 62 in the rear leg 36 in the case where the positions of the legs are reversed) to releasably lock the locking member 32 in the closed position. When the locking member 32 is in the open position shown in FIG. 1 and in broken lines in FIG. 5, the locking pin 52 extends into the bore 24 in the base 22 and engages the adjacent end portion of the front leg 34 of the locking member 32 to retain the locking member in the open position against the force of the spring 38. The locking pin 52 may be moved upwardly against the force of the spring 56 to a release position wherein it does not extend into the bore 24 by pulling upwardly on the lanyard L or the ring 60 secured to the upper end of the pin 52.

Figure 2:
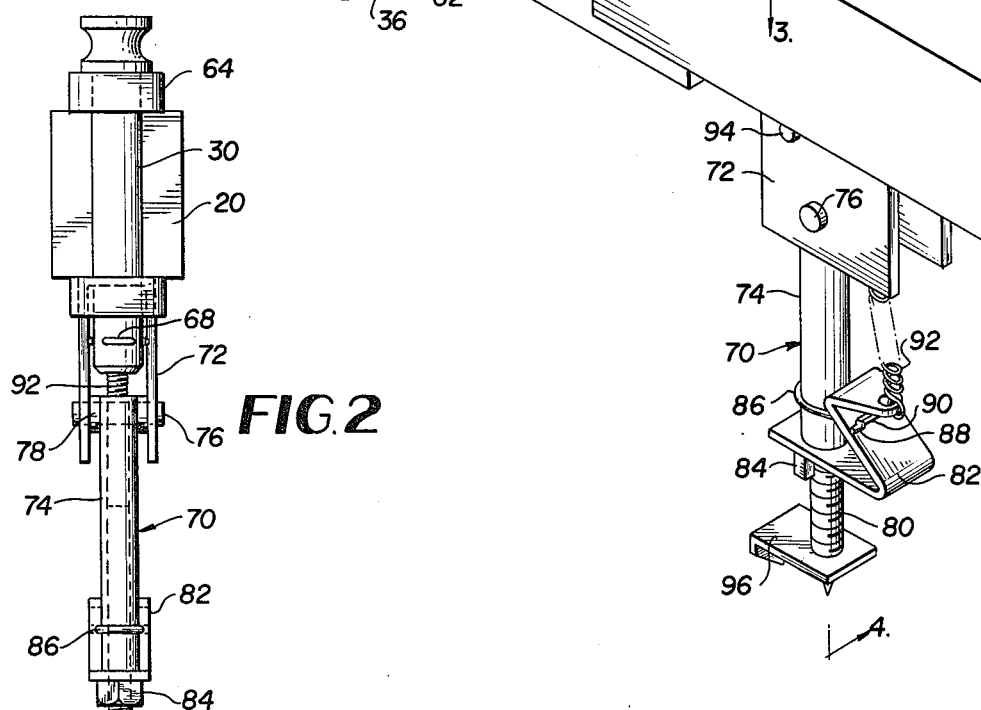
FIG. 2 is a front elevational view of the tongue portion of the hitching apparatus shown in FIG. 1.
Figure 4:
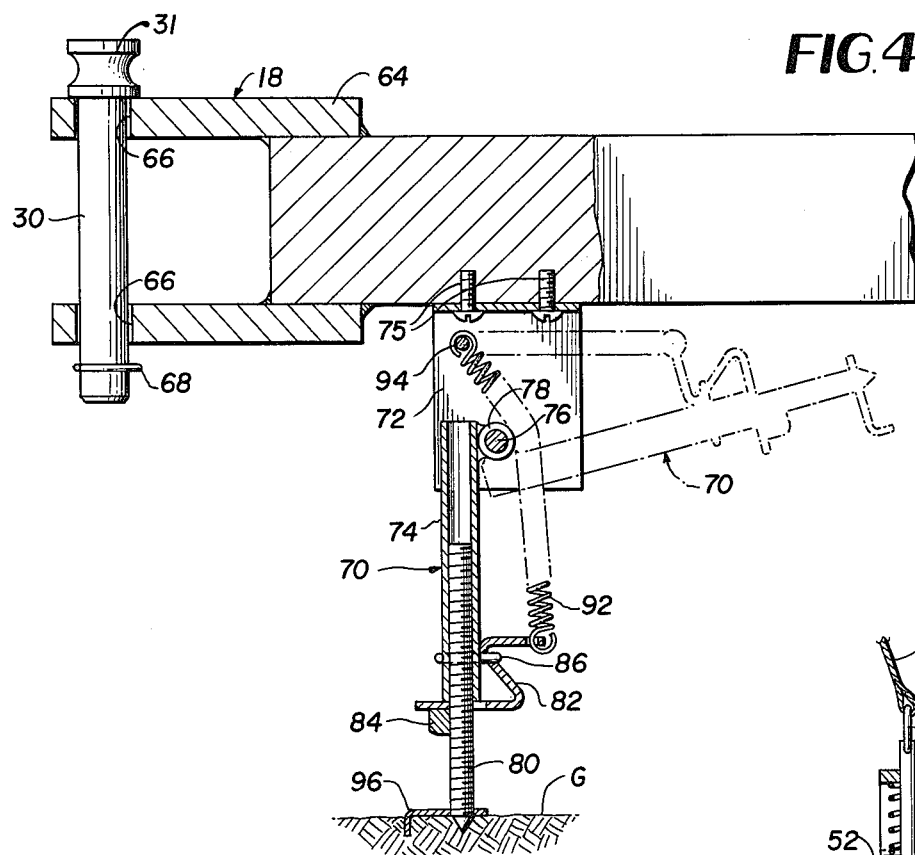
FIG. 4 is an enlarged sectional view, with parts broken away, taken substantially along line 4-4 in FIG. 1.
Figure 6:
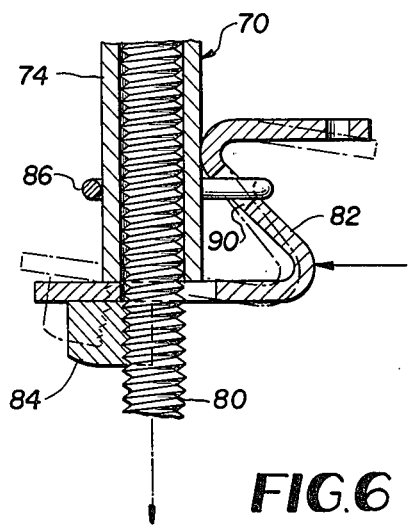
FIG. 6 is an enlarged side elevational view, with parts in section and parts broken away, of the locking bracket portion of the elevator device for the tongue shown in FIGS. 1 and 4.

Referring to FIGS. 2, 4 and 6, the pin assembly 18 of the hitching apparatus 10 comprises a clevis 64 secured in any suitable manner to the tongue 20 and having a pair of substantially vertically aligned apertures 66 through which the pin 30 extends. The upper end of the pin 30 is provided with an enlarged head portion 31 and any suitable means, such as a cotter pin 68, is utilized to retain the pin 30 in position in the clevis apertures 66. As shown in FIG. 1, the pin 30 is adapted to be received within the rearwardly opening slot 28 in the base 22 of the locking assembly 12, and the rear portion of the base 22 is adapted to extend between the upper and lower portions of the clevis 64 when the pin 30 is received in the rear slot 28.

In accordance with another feature of the present invention, an elevator device 70, shown in FIGS. 1, 2, 4 and 6, is provided for the purpose of maintaining the tongue 20 and pin assembly 18 in a predetermined elevated position when the vehicle to be towed is parked and unhitched. The elevator device 70 comprises a generally U-shaped mounting plate 72 secured to the lower portion of the tongue 20 in any suitable manner, such as by screws 76. A tubular leg member 74 is pivotally connected at its upper end to the mounting plate 72 by a pivot pin 76 rotatably mounted on the mounting plate and extending through a transverse tubular portion 78 secured to the upper end of the tubular leg member 74.

A threaded shaft 80 is slidably mounted within the tubular leg member 74 and extends downwardly from the lower end thereof. For the purpose of releasably locking the threaded shaft 80 to the tubular leg member 74, a locking bracket 82 is provided having a lower leg with an aperture through which the threaded shaft 80 extends. A half nut section 84 is secured to the lower leg of the locking bracket 82 and is provided with internal threads that are engagable with the threads of the threaded shaft 80 to lock it in a predetermined vertical position relative to the tubular leg member 74. The locking bracket 82 is retained on the tubular leg member 74 for limited pivotal movement relative thereto by a generally U-shaped, wire-like retaining member 86 surrounding tubular leg member 74 and having tabs 88 which extend through a substantially lateral slot 90 in the locking bracket 82, as shown in FIGS. 1 and 6.

A helical spring 92, secured at its lower end to the upper leg of the locking bracket 82 and secured at its upper end to a pin 94 on the mounting plate 72, serves to urge the mounting bracket 82 in a counterclockwise direction about the retainer 86 to urge the half nut 84 into engagement with the threaded shaft 80 for the purpose of maintaining the shaft 80 in a predetermined position relative to the tubular leg member 74. As shown in FIG. 6, the locking bracket 82 may be rotated in a clockwise direction about the retainer 86 against the force of the spring 92 to move the half nut 86 to the broken line position wherein it is out of engagement with the threaded shaft 80 to enable the shaft 80 to be vertically adjusted relative to the tubular leg 74 member to vary the height of the tongue 20 and pin assembly 18, if desired. Upon release of the locking bracket 82, the spring 92 serves to move the locking nut 84 back into engagement with the threaded shaft 80 to retain it in the selected position relative to the tubular leg member 74.

The helical spring 92 also serves to urge the elevator device 70 to the upper position shown in broken lines in FIG. 4, wherein the tubular leg member 74 has been pivoted in a counterclockwise direction about the piviot pin 76. In order to maintain the elevator device 70 in the lower support position shown in solid lines in FIG. 4, for the purpose of maintaining the tongue 20 and pin assembly 18 in an elevated position, the lower end of the threaded shaft 80 is pointed and a foot plate 96 is secured to the lower end of the threaded shaft for the purpose of facilitating the urging of the lower end of the threaded shaft into the ground surface G to maintain it in the lower position against the force of the helical spring 92.

In the operation of the hitching apparatus 10 of the present invention, when it is desired to connect or hitch the draw bar 16 to the tongue 20, all that is initially required is rearward movement of the towing vehicle supporting the draw bar 16 and locking assembly 12. This is based on the assumption that the tongue 20 secured to the vehicle to be towed is supported at a suitable height by the elevator device 70 such that the pin 30 enters the rearwardly extending slot 28 in the base 22 of the locking device 12 as the towing vehicle is moved rearwardly. This is also based on the assumption that the U-shaped locking member 32 is in the open position shown in FIG. 1 wherein the rear leg 36 is removed from the slot 28. As hereinbefore mentioned, the U-shaped locking member 32 is maintained in the open position against the force of the spring 38 by the locking pin 52 which engages the inner end of the leg 34 in the bore 24 as shown in broken lines in FIG. 5.

In practice, the draw bar 16 and locking assembly 12 are moved rearwardly until the pin 30 is positioned at the forward end of the slot 28 in the base 22, as shown in FIG. 3. Thereafter, the lanyard L may be pulled upwardly to pull the locking pin 52 out of the bore 24 in the base 22, thereby enabling the U-shaped locking member 32 to be moved to the closed position shown in FIG. 3 wherein the leg 36 extends across the slot 28 to retain the pin 30 therein. In the closed position, the curved recess 48 of the leg 36 is disposed adjacent the pin 30 so as to provide an interference fit therewith during towing to prevent lateral movement of the U-shaped locking member 32.

Since the lanyard L can be pulled from the cab of the towing vehicle, it is not necessary for the operator to leave the towing vehicle for the purpose of connecting the draw bar 16 to the tongue 20. After the hitching operation is completed, the towing and towed vehicles may be moved forwardly without requiring the operator to leave the towing vehicle for the purpose of removing the elevator device 70 for the tongue 20 from the ground, since the spring 92 serves to pivot the elevator device 70 upwardly to the broken line position shown in FIG. 4 as the hitched vehicles are moved forwardly and the lower end of the threaded shaft 80 moves out of contact with the ground surface.

It will be readily seen, therefore, that with the present invention, a hitching operation may be accomplished without requiring the operator of the towing vehicle to leave the towing vehicle. When it is desired to accomplish an unhitching operation, it will then be necessary for the operator to leave the towing vehicle, release the locking pin 52, move the U-shaped locking member 32 laterally outwardly to the open position shown in FIG. 1, and pivot the elevator device 70 downwardly from the broken line position to the solid line position shown in FIG. 4 wherein the lower end of the threaded shaft 80 is pressed into the adjacent ground surface. The operator then enters the towing vehicle and pulls away, leaving the tongue 20 of the towing vehicle supported in a suitable elevated position by the elevator device 70 such that a future hitching operation can be completed without requiring the operator to leave the cab of the towing vehicle.

What is claimed is:

1. Apparatus for hitching mobile equipment, comprising a locking assembly, said locking assembly comprising:
   a base having a pair of substantially parallel laterally extending bores therethrough and a rearwardly opening slot intersecting one of said bores,
   a substantially U-shaped locking member having a pair of generally laterally extending legs having inner ends slidably mounted in said bores, said locking member being movable between a closed position wherein one of said legs extends across said rearwardly opening slot to close it and an open position wherein said one leg is removed from said slot,
   means for urging said locking member to said closed position, and
   means for releasably retaining said locking member in said open or said closed position, said retaining means comprising a locking pin movably mounted on said base said locking pin having an inner end and an outer end, said inner end being movable into the other of said bores, and the other of said legs having a first notch therein adapted to receive said locking pin therein, whereby said locking pin serves to retain said locking member in said closed position by movement of said locking pin into said other bore and into said notch in said other leg and said locking pin serves to retain said locking member in said open position against the force of said urging means by movement of said locking pin into said other bore wherein it is engaged by the inner end of said other leg.

2. The hitching apparatus of claim 1 wherein said urging means comprises a spring connected to said base and said locking member.

3. The hitching apparatus of claim 1 further comprising means for biasing said locking pin to a locking position within said other bore.

4. The hitching apparatus of claim 3 further comprising a gripping member connected to the outer end of said locking pin, and a lanyard connected to said gripping member to facilitate movement of said pin to a release position out of said other bore.

5. The hitching apparatus of claim 1 wherein said one leg has a second notch therein on the side thereof opposite to the side of said other leg having said first notch therein, said first and second notches being so positioned that the positions of said one leg and said other leg can be reversed in said bores.

6. The hitching apparatus of claim 1 wherein said locking assembly is adapted to be connected to a towing vehicle; and further comprising a pin assembly adapted to be connected to a tongue of a vehicle to be towed, said pin assembly having a pin adapted to be received in said slot, and an elevator device adapted to be movably connected to the tongue and adapted to engage the ground to releasably maintain the tongue in a predetermined elevated position such that said pin is positioned to be receivable within said slot.

7. The hitching apparatus of claim 6 wherein said elevator device comprises a tubular leg member pivotally connected at its upper end to the tongue, a shaft slidably mounted within said leg member and having a lower end engagable with the ground, means for releasably locking said shaft to said leg member, and means for urging said leg member upwardly away from the ground to a position adjacent the tongue.

* * * * *